2,991,878
HEAVY MEDIA SEPARATION OF POROUS MATERIAL

Wright W. Gary, Princeton, and James B. Duke, Metuchen, N.J., assignors to Minerals & Chemicals Philipp Corporation, a corporation of Maryland
No Drawing. Filed Aug. 7, 1957, Ser. No. 676,706
13 Claims. (Cl. 209—4)

This invention relates to a novel process for the separation of porous solids in a so-called "heavy media," the separation being based on the differences in particle density resultant from differences in internal pore structures and surface areas of particles of the solids. More particularly, the invention relates to the separation of porous catalyst into fractions of different catalytic activity based on differences in effective particle density.

It is well known that the reactivity of a solid contact mass used in heterogeneous catalytic processes is a function of the available catalytic surface; hence solid contact masses are usually prepared in the form of microporous structures having an available surface preferably over about 50 square meters per gram, the available surface being nearly all inner surface provided by the microporous structure. This available surface is readily measured by the low temperature nitrogen absorption method described by Emmet and Brunauer, JACS 59, 1553 (1937). These catalysts are generally porous composites of silica and alumina of either synthetic or natural origin. The synthetic catalysts are prepared by joint precipitation of silica and alumina, silica, alumina and zirconia, alumina and magnesia, and the like, or the incorporation of alumina or the like in a silica gel or precipitate. The natural catalysts, typified by active or activated clays, such as kaolinite and montmorillonite clays, are porous refractory solids. During the catalytic conversion process a hydrocarbonaceous deposit (coke) on the surface of the porous contact mass is produced which is periodically removed to renew the catalytic activity of the contact mass by the action of an oxidizing gas at elevated temperatures. Although precautions are taken to avoid the use of temperatures which impair the catalytic activity of the contact masses, nevertheless either due to a gradual deterioration during use or to the temperatures used during regeneration, it has been found that the activity of the catalyst diminishes, this being accompanied by changes in various physical properties such as density, porosity and specific surface area. The catalyst is replaced in fixed bed systems when the activity has declined to an uneconomical level whereas in moving bed systems, exemplified by the Houdriflow and T.C.C. (Thermofor Catalytic Cracking) processes, it is common practice to withdraw a small stream of catalyst in the system and continuously or at intervals replace the material withdrawn with fresh catalyst. Hence, at any time during the operation of a catalytic cracking unit it is usual to have catalyst particles of varying activity in the mass of catalyst particles in use, the optimum average activity level being referred to as the equilibrium level.

There is an obvious economic advantage to separate relatively fresh, high activity catalyst particles from the less active or dead catalyst particles and return the active fraction to the hydrocarbon conversion unit.

It has been found that changes in the physical structure of the initially highly microporous catalyst mass are concomitant to decline in catalytic activity of the mass. The change is essentially of a nature to decrease the free surface area of the particle and may take place by a two-fold mechanism. Within the core of the particle there may be a consolidation resulting from a shrinkage in the pore volume and decrease in number of pores and, secondly, the surface of the deactivated particle may become at least partially sealed. Frequently both mechanisms operate simultaneously. The effect of such a shrinkage of pore volume and/or sealing of the surface pores is to increase the particle density of the particle over that of an active particle. The term "particle density" as used herein refers to the weight of a particle in air divided by its volume, the volume including those voids in the particle which are filled with air. Variations in the number of pores, pore volume and hence surface area of any particulate porous solid reflect in variations of particle density of that particle. The term is to be distinguished from "effective particle density" which as used hereafter refers to the density of a particle in which at least a portion of the air initially present in any pores is filled with a treating liquid, which liquid will be hereinafter called "interstitial liquid," when the particle including any interstitial liquid is immersed in a liquid medium. By soaking the catalyst in a treating liquid of sufficiently low viscosity the liquid enters accessible pores of the catalyst by displacing air, the amount of liquid thus entering being a function of time and depending to a great extent on the number, volume and accessibility of pores. Hence a more active catalyst fraction will sorb greater quantities of the soaking fluid and contain more interstitial liquid than a less active fraction in which surface sealing precludes the entry of liquid and/or the core pores are fewed in number and volume.

It will be understood that this invention is not limited to the separation of a catalyst or other porous solid which has been changed in physical properties during use. The practice herein taught is applicable to the classification of porous masses such as desiccants, zeolites, bauxite, or any material having fractions of differing porosity, particle density and/or specific surface area, due, for example, to faulty initial processing of the porous masses.

Prior art attempts have been made to separate such masses having fractions of differing porosity by sink-and-float methods in which the masses including porous fractions are dispersed in a heavy liquid having a density intermediate between the effective particle density of the most dense and least dense particles of the mass to effect separation between these particles of differing densities by gravity. These heavy liquids include heavy halogenated hydrocarbon liquids or heavy aqueous salt solutions, such as zinc chloride solutions. Although adequate separation or classification of spent catalysts into fractions of highly porous catalytically active particles and less porous relatively inactive particles may be effected by these means, nevertheless those liquids heavy enough to accomplish the desired separation leave deleterious residues on the catalyst particles. In the case of the halogenated hydrocarbons, that portion of the interstitial liquid which cannot be effectively removed from the inner pores of the contact mass without the use of thermal treatment which impairs the activity of said particles acts as a catalyst poison; likewise, metallic ions, such as zinc ions, used in heavy aqueous liquid solutions act as catalyst poisons when entrained within the microporous structure of a catalytically active particle. The use of concentrated sulfuric acid solutions as the heavy liquid to effect stratification of catalyst particles of differing catalytic activity and porosity has been suggested; however, the use of concentrated sulfuric acid presents numerous well known operational hazards, and may result in the catalyst reacting with the acid.

It is well known in the art that materials of substantially identical compositions and size but differing in density may be effectively separated by a so-called "heavy media." In "heavy media" processes the zone in which the concentration of materials of differing specific gravity takes place is increased and gravitational concentration takes place in an extended volume of the floating medium. This is accomplished by using a suspension of very finely divided solids in a vehicle, usually aqueous, as the fluid supporting medium, the specific gravity of the suspension increasing from the surface downwards, the increase in specific gravity being subject to control at all times. With this arrangement the specific gravity of the medium at the surface is made to be slightly greater than the specific gravity of the lighter particles. The specific gravity of the differential density medium increases downward until near the bottom of the column of fluid the specific gravity is less than that of the heavier particles, whereby the lighter particles cannot sink below this point. As the material is fed to the separating device the particles are separated according to their effective particle densities, the lighter particles being collected and removed from the surface and the heavier particles withdrawn at the base of the column of the suspending fluid. Heavy media are commonly supplied by suspending in water particles of such materials as hematite, magnetite, galena, sand, barite, pyrite, copper, high carbon steel, clay, quartz, slate and ferrosilicon. Some factors to be considered in the choice of a solid for a heavy medium are specific gravity, hardness, resistance to corrosion, particle size distribution and shape, sedimentation characteristics, recoverability and cost. Water is the common vehicle, because of cost considerations and safety factors. The mean specific gravity of the heavy medium and the gradation of the specific gravity are controlled by adjusting the proportion of solids and by making changes in the particle shape, and distribution of the finely-divided solids used in making up the heavy media. The method is described in detail in Taggart, Handbook of Mineral Dressing (1945) 11— 106–125.

Attempts to separate catalysts into fractions of differing catalytic activity and hence bulk density and specific area by the aforementioned heavy media process have failed primarily because of the tendency of the comminuted solids of the heavy media to deposit on the particles and rigidly attach themselves thereto when the liquid portion of the media enters the pores of the structure, thus interfering with both efficient separation of the fractions and necessitating the removal of these attached solids from the surface of the catalyst particles. Furthermore, even if this tendency were obviated the alteration in effective density resulting from the water of the medium filling the interstices of the microporous structure would act to reduce the relative effective density differential between the more and less porous fractions.

Accordingly, it is a primary object of this invention to modify the conventional heavy media separation process to make it useful and practical in the separation of a material into fractions of differing porosity or specific surface. It is another object of the invention to subject a microporous catalyst, synthetic or natural, to a novel treatment prior to separating active particles of that catalyst from relatively inactive particles whereby efficiency of classification is improved and prevention of deposition of the comminuted solid component of the heavy media on the catalyst surface is facilitated. Other objects will be apparent from a reading of the following description and example set forth.

In brief, we have discovered that the separation or classification of a microporous solid into fractions of differing particle density or specific surface may be efficiently effected in a heavy media process if the said microporous solid is subjected, prior to classification in a heavy media, to a soaking in a liquid which is preferably substantially immiscible with and, has a specific gravity less than the specific gravity of the liquid component of the heavy media. When this principle is applied to the separation of a catalyst into fractions of varying catalytic activity, separation into a fraction or fractions of relatively low activity and fraction or fractions of relatively high activity is accomplished by soaking the catalyst in an organic liquid having no metallic constituents and having a specific gravity less than that of water at the temperature of processing. The separation is effected in a heavy media whose density is such that the active or live particles float and the inactive particles sink. By means of the soaking fluid the relative effective density of the active and inactive particles is adjusted so that not only is a sharper separation effected, but also the deleterious action of the comminuted solids adhering to the surface of the catalyst particles is avoided because the interstices of the particles are preferentially wet by and at least partially filled by the organic liquid. This prevents entry of the liquid component into the pores of the solid with accompanying deposition of comminuted solid component of the heavy media on the surface of said catalyst particle.

It has been noted that the catalytically inactive or dead catalyst particles have a lower mean free surface (as measured by low temperature nitrogen absorption methods) and higher particle density than catalytically active particles, since the deactivation of the catalyst particle is accompanied by a consolidation of the structure of the catalyst particle with a decrease or contracting of the pore volume and in some cases at least a partial sealing of the surface of the particle. When a partially spent contact mass including particles of fresh, relatively highly porous material and dead, compacted particles is subjected to a soaking in a liquid it is found that more of said liquid penetrates the porous material, displacing to a degree air entrapped in said pores, depending on the particular liquid soaking agent used, the volume and distribution of the pores in the material and the time during which the material is contacted with said liquid. Were the interstices of the particles filled with water, as would be the case if the presoaking step were omitted, the relative difference in effective density between the active and inactive catalyst particles would be decreased because of the greater pick-up of water by the lighter particle which weighted particle would acquire an effective density close to that of the less porous, higher bulk density material. However, by loading the particles with at least sufficient soaking liquid to seal the pores of the particle against penetration by the water of the heavy medium the difference between the effective densities of the fractions of catalyst in the heavy medium is enhanced and the efficiency of the separation is improved.

Where the liquid component of the heavy medium is water, this being the most desirable vehicle from the standpoint of economy the preferred soaking agent is a liquid, preferably low viscosity, hydrocarbon having a specific gravity less than 1.0 and which is immiscible or only slightly miscible with water. The soaking liquid should exclude any constituents such as metallic ions which would leave a deleterious residue on the particles, particularly when the particle is a catalyst particle. Useful soaking agents include kerosene, light mineral oil and naphtha, etc.

A surface active agent may be used as an adjuvant to the soaking agent to enhance the ability of the soaking agent to penetrate throughout the interstices of the catalyst particle and at least partially replace the air filling them, this resulting in improved separation of active from inactive particles. Although I do not wish to be bound by theory it is felt that the surface-active agent acts to improve the ability of the soaking agent to penetrate through the porous structure of the active particles, whereby the degree of loading of the active particle with the soaking agent is increased, this producing a sharper difference in effective density between the particles to be classified than when the penetration of the soaking agent is less efficient. The surface active agent may be cationic, anionic or nonionic, the choice depending on the soaking liquid used. Tall oil has been found to be an effective agent where kerosene is the soaking agent. The optimum amount of surface-active agent to be employed in any particular case may be determined by simple experiment; however, we have found that excessive amounts may result in undesirable agglomeration of the particles in aqueous media.

In practice, a particulate, microporous material preferably having a major portion thereof including particles no smaller than about 28-mesh and having fractions of different bulk density and/or specific surface is soaked for a suitable time in a soaking liquid of the nature described in any suitable vat or the like at a temperature preferably below the boiling point of the soaking agent used. Where soaking takes place above the boiling point of the soaking agent or when the soaking agent has a relatively high vapor pressure a condenser may be used to prevent loss of soaking liquid to the air. Usually slight agitation of the mixture of particles and soaking liquid is desirable to improve the contact therebetween. The excess liquid is preferably drained from the particles. The particles are introduced into any apparatus well known in the art for effecting separation of particles of different specific gravity by a heavy medium, suitably the cone-type separator described in U.S. Patent No. 1,895,504 to Wuensch. The soaked feed is introduced into the separator filled with a heavy medium having its specific gravity so adjusted that the density at the bottom of the column of medium is less than the effective particle density of the heavier particles (which in the case of the feed being a partially spent catalyst is the spent, surface sealed particles) and the top, lower specific gravity heavy medium is heavier than the lighter particles. The floated, active (in the case of catalyst feed) particles are withdrawn in a weir overflow to a drainage screen, the medium returning to the separating device. The sinks, those heavier particles which in the case of catalyst feed are mainly spent or relatively inactive are withdrawn from the bottom to a drainage screen. Either product, if desirable, may be subjected to additional heavy media separations to further improve the overall separation. The medium drained from the floats and sinks is recycled by means well known in the art. In general non-turbulent agitation is used, such as slow mixing by a peripheral paddle.

The soaking liquid and any entrained heavy medium may be removed from the porous particles by a water wash followed by evaporation or steam distillation.

When the floats include the fraction to be recovered (as in catalyst separation) the heavy medium effluent with the lighter, floated particles after being separated by a screen from the floated particles is circulated back to the heavy media apparatus, diluted when necessitated by fluid loss, to maintain a continued controlled variation in specific gravity throughout the heavy-media separator. Alternatively, when the process is applied to the separation of a material into fractions in which the valuable portion is in the sinks the recovery process is applied to the sink fraction.

The process is not limited to any particular apparatus to effect separation in the heavy media. Both the cylindrical and conical types of separators for the purpose may be used.

The following example is given to contribute to a better understanding of the invention and is not to be construed as limiting the scope thereof.

A sample of partially spent pelleted catalyst was withdrawn from a hydrocarbon conversion unit, the sample being known to include a portion of relatively fresh activated kaolin catalyst initially having a surface area of about 95 square meters per gram and a bulk density of 47.5 and activated bentonite catalyst which had been in the unit a longer time. The sample was separated into bulked fractions of high and low effective density and surface area by means of the process within the scope of our instant invention.

The sample was soaked in kerosene (specific gravity 0.793) for 5 minutes and drained free of excess kerosene. The pelleted sample including interstitial kerosene was continuously fed into a conical heavy media separating unit in which the heavy medium was a suspension of finely ground magnetite in water having an average specific gravity of 1.78, the specific gravity in the unit ranging from 1.71 at the top of the heavy media column to 1.86 at the bottom. A float and sink fraction was continuously removed during the feeding process. The sink product was twice recycled through the unit to permit entrained particles having a lower effective particle density to be recovered. The analysis of bulk density and free surface area of feed and the float and sink fractions obtained by heavy media separation are tabulated below:

| Products | Recovery, Percent by Wt. | Surface Area, m.$^2$/g. | Bulk Density, lb./ft.$^3$ |
| --- | --- | --- | --- |
| Feed | 100.0 | 65.0 | 56.2 |
| 1st Float | 67.3 | 74.4 | [1] 53.0 |
| 2nd Float | 4.9 | | |
| 3rd Float | 2.4 | | |
| 3rd Sink | 25.4 | 31.5 | 65.5 |

[1] Calculated value.

The results show a separation in the heavy media into: a float fraction constituting the major portion of the feed and having a relatively high surface area, indicating that the material composing the float fraction retains its microporous structure and hence activity; and, a sink fraction having a higher bulk density than the feed and a low surface area, indicating a consolidation of the skeleton of the structure of the particles composing this fraction. The porosity of the feed and fraction separated in the heavy media and processing were studied by measurements of surface area which were determined by the low temperature nitrogen adsorption method described by Emmet and Brunauer, JACS 59, 1553 (1937).

Thus it is evident that the process achieved the separation of a multi-component catalyst into active and deactivated particles, the activity being related to the surface area of the particle. Furthermore, analysis of the more porous, initially floated fraction of the catalyst shows this fraction included active catalyst including both kaolin and bentonite particles. The same type of analysis applied to the less porous fraction of feed which sank in the heavy media showed that this material, too, included both kaolinitic and bentonitic particles. This indicates that separation was effected by physical structure rather than composition.

Obviously many modifications and variations of the invention set forth hereabove may be made without departing from the spirit and scope thereof and therefore only such limitations should be imposed as are indicated in the appended claims.

We claim:

1. In a process for separating a granular material having fractions of differing porosity which includes adding said granular material to a column of heavy media having a specific gravity at the top of said column greater than the specific gravity of the lighter particles of said granular material and a specific gravity at the bottom of said column less than that of the heavier particles of said granular material, and recovering from the floated material a fraction relatively high porosity: the improvement which comprises soaking said granular material in a liquid having a specific gravity less than that of the liquid vehicle of the heavy medium prior to the addition of said granular material to the heavy media thereby preventing adhesion of the comminuted solids of the heavy media to said granular material and increasing the effective particle density differential between particles of differing porosity when immersed in said heavy media.

2. The process of claim 1 in which said granular material is a catalyst.

3. The process of claim 1 in which the granular material is soaked in a substantially water-immiscible, non-viscous hydrocarbon liquid having a specific gravity less than about 1.00; and in which the vehicle of said heavy media is aqueous.

4. The process of claim 1 in which: the granular material is soaked in a non-metallic, substantially water-immiscible, non-viscous hydrocarbon liquid having a specific gravity less than about 1.00 and in which the vehicle of said heavy media is aqueous.

5. In a process for separating a catalyst comprising particles of at least 28-mesh into fractions of differing porosity in a heavy aqueous media the improvement which comprises soaking said catalyst in a substantially water-immiscible, non-metallic, non-viscous hydrocarbon liquid having a specific gravity less than about 1.00 and removing excess organic liquid therefrom prior to the addition of said catalyst to the heavy aqueous media, thereby preventing adhesion of the comminuted solids of the heavy media to said granular material and increasing the effective particle density differential between particles of differing porosity when immersed in said heavy aqueous media.

6. The process for preventing adhesion of the comminuted solids component of a heavy media to porous granular solids treated in said heavy media which comprises filling the pores of said granular material with a non-viscous liquid substantially immiscible with and having a specific gravity less than that of the liquid component of said heavy media.

7. The process for preventing adhesion of the comminuted solids component of a heavy aqueous media to a porous catalyst particle treated therein which comprises filling the pores of said catalyst particle with a non-metallic, substantially water-immiscible, non-viscous hydrocarbon liquid having a specific gravity less than that of water.

8. The process for separating a granular material having fractions of differing porosity into a fraction of relatively high porosity and a fraction of relatively low porosity which comprises: immersing said granular material in a liquid having a specific gravity less than the specific gravity of the liquid of a heavy media vehicle whereby adsorbed interstitial liquid accentuates the difference in effective particle density between the fraction of relatively high and relatively low porosity; removing excess liquid; adding said granular material including interstitial liquid to a column of heavy media having a specific gravity at the top of said column greater than the specific gravity of the lighter particles of said granular material when filled with said interstitial liquid and a specific gravity at the bottom of said column less than that of the heavier particles of said granular material when filled with said interstitial liquid; and recovering from the floated material a fraction of relatively high porosity.

9. The process of claim 8 in which the soaking liquid is a hydrocarbon and the vehicle of the heavy media is aqueous.

10. The process of claim 8 in which the soaking liquid is a non-metallic, substantially water-immiscible, non-viscous, hydrocarbon compound and the vehicle of the heavy media is aqueous.

11. The process for separating at least partially spent porous catalyst into a fraction of relatively high porosity and a fraction of relatively low porosity which comprises: immersing the catalyst in a substantially water-immiscible, non-viscous, liquid hydrocarbon having a specific gravity less than about 1.00 whereby absorbed interstitial liquid accentuates the difference in effective particle density between said high and low porosity catalyst particles; removing excess liquid therefrom; and adding said catalyst including interstitial liquid to column of aqueous heavy media having a specific gravity at the top of said column greater than the specific gravity of the lighter catalyst particles when filled with said interstitial liquid and a specific gravity at the bottom of said column less than that of the heavier catalyst particles when filled with said interstitial liquid; and recovering from the floated material a fraction of catalyst of relatively high activity.

12. The process of claim 11 in which the hydrocarbon is non-metallic.

13. The process of claim 11 in which the catalyst comprises particles at least greater than 28-mesh.

References Cited in the file of this patent

UNITED STATES PATENTS

| | | |
|---|---|---|
| 1,895,504 | Wuensch | Jan. 31, 1933 |
| 2,483,372 | Payne | Sept. 27, 1949 |
| 2,631,968 | Peery | Mar. 17, 1953 |
| 2,643,215 | Loge | June 23, 1953 |
| 2,699,256 | Wilson | Jan. 11, 1955 |
| 2,832,470 | Rietema | Apr. 29, 1958 |